(12) United States Patent
Cooksey et al.

(10) Patent No.: US 7,464,791 B2
(45) Date of Patent: Dec. 16, 2008

(54) ACOUSTIC MATS AND METHODS FOR MAKING THE SAME

(75) Inventors: Timothy S. Cooksey, Coshocton, OH (US); John Ewing, Millersburg, OH (US)

(73) Assignee: Pretty Products, LLC, Rochester Hills, MI (US)

( * ) Notice: Subject to any disclaimer, the term of this patent is extended or adjusted under 35 U.S.C. 154(b) by 486 days.

(21) Appl. No.: 11/044,876

(22) Filed: Jan. 27, 2005

(65) Prior Publication Data
US 2006/0162997 A1 Jul. 27, 2006

(51) Int. Cl.
*E04B 1/74* (2006.01)
(52) U.S. Cl. .............. 181/296; 181/284; 181/286; 181/290; 181/293
(58) Field of Classification Search .......... 181/284, 181/286, 290, 293, 296
See application file for complete search history.

(56) References Cited

U.S. PATENT DOCUMENTS

| | | | | |
|---|---|---|---|---|
| 2,546,394 A * | 3/1951 | Cline | ............... | 428/169 |
| 4,174,991 A | 11/1979 | Reuben | | |
| 4,340,633 A * | 7/1982 | Robbins, Jr. | ............ | 428/99 |
| 4,399,176 A * | 8/1983 | Bell et al. | ............ | 428/85 |
| 4,465,720 A * | 8/1984 | Bell et al. | ............ | 428/85 |
| 4,748,063 A * | 5/1988 | Reuben | ............ | 428/78 |
| 4,829,627 A * | 5/1989 | Altus et al. | ............ | 16/4 |
| 4,966,799 A * | 10/1990 | Lucca et al. | ............ | 428/95 |
| 5,034,258 A * | 7/1991 | Grace | ............ | 428/78 |
| 5,154,961 A * | 10/1992 | Reuben | ............ | 428/82 |
| 5,171,619 A * | 12/1992 | Reuben | ............ | 428/95 |
| 5,362,544 A * | 11/1994 | Reuben | ............ | 428/82 |
| 5,380,574 A | 1/1995 | Katoh et al. | | |
| 5,744,209 A * | 4/1998 | Parkes | ............ | 428/96 |
| 5,776,583 A * | 7/1998 | Peyton | ............ | 428/120 |
| 5,876,826 A | 3/1999 | Hoffmann et al. | | |
| 6,022,608 A | 2/2000 | Dell 'Acqua | | |
| 6,027,782 A * | 2/2000 | Sherman | ............ | 428/88 |
| RE36,677 E * | 5/2000 | Reuben | ............ | 156/219 |
| 6,114,014 A * | 9/2000 | Ikeda et al. | ............ | 428/192 |
| 6,238,765 B1 * | 5/2001 | Bailey et al. | ............ | 428/95 |
| 6,253,872 B1 * | 7/2001 | Neumann | ............ | 181/210 |
| 6,340,513 B1 * | 1/2002 | Hammond et al. | ............ | 428/95 |
| 6,382,350 B1 * | 5/2002 | Jezewski et al. | ............ | 181/290 |
| 6,605,333 B2 * | 8/2003 | Ferreira et al. | ............ | 428/95 |
| 6,663,537 B2 * | 12/2003 | McCoy | ............ | 482/23 |
| 6,946,184 B2 * | 9/2005 | Robbins, III | ............ | 428/120 |
| 7,182,994 B1 * | 2/2007 | Scott | ............ | 428/131 |
| 2002/0187300 A1* | 12/2002 | Nakasuji et al. | ............ | 428/95 |
| 2004/0048036 A1* | 3/2004 | Nakasuji et al. | ............ | 428/95 |
| 2005/0079318 A1* | 4/2005 | Putt et al. | ............ | 428/95 |
| 2006/0008617 A1* | 1/2006 | Sourang | ............ | 428/138 |
| 2006/0099387 A1* | 5/2006 | Parkes et al. | ............ | 428/156 |

\* cited by examiner

*Primary Examiner*—Walter Benson
*Assistant Examiner*—Jeremy Luks
(74) *Attorney, Agent, or Firm*—Dinsmore & Shohl LLP

(57) ABSTRACT

Acoustic mats include a face layer and an absorptive layer having first and second surfaces wherein the second surface of the absorptive layer may be secured to said face layer. The mat further includes a plurality of discrete segments secured to the first surface of the absorptive layer such that regions of the first surface of the absorptive layer may be exposed, thereby allowing sound to pass between adjacent discrete segments into the absorptive layer.

10 Claims, 5 Drawing Sheets

ACOUSTIC MATS AND METHODS FOR MAKING THE SAME

BACKGROUND OF THE INVENTION

The present invention generally relates to acoustically absorptive mats. More particularly, the present invention relates to acoustically absorptive, automobile floor mats and methods for making the same.

It is desirable to eliminate or reduce noise within the interior (e.g. cabin) of automobiles in order to provide a more acoustically pleasing environment for passengers. Noise within an automobile cabin may be generated from a variety of sources, including the outside environment (e.g. the road or wind), or by the automobile itself (e.g. the engine or exhaust). In the past, accessory manufacturers have tried to reduce cabin noise through the development of automotive floor mats manufactured to absorb noise within an automobile's cabin. These mats generally include an absorptive layer secured between a carpet and a base layer of molded plastic. An issue arises with this approach in that such past mats are relatively slow and expensive to manufacture.

Accordingly, there is a need for acoustically absorptive floor mats that provide enhanced noise absorption that can also be efficiently manufactured.

SUMMARY OF THE INVENTION

Accordingly, the present invention is intended to address and obviate problems and shortcomings and otherwise improve previous acoustic floor mats and methods for making the same.

To achieve the foregoing and in accordance with the exemplary embodiments of the present invention, an acoustic mat comprises a face layer and an absorptive layer having first and second surfaces wherein the second surface of the absorptive layer may be secured to the face layer. The mat further comprises a plurality of discrete segments secured to the first surface of the absorptive layer such that regions of the first surface of the absorptive layer may be exposed, thereby allowing sound to pass between adjacent discrete segments.

To still further achieve the foregoing and in accordance with the exemplary embodiments of the present invention, an acoustic mat comprises a face layer and an absorptive layer having first and second surfaces, the second surface of the absorptive layer secured to the face layer. The mat further comprises a base layer extruded onto the first surface of the absorptive layer such that regions of the first surface of the absorptive layer may be exposed, thereby allowing sound to pass between adjacent discrete segments.

To yet further achieve the foregoing and in accordance with other exemplary embodiments of the present invention, a method for making an acoustic mat comprises providing a web having a face layer and an acoustically absorptive layer having first and second surfaces, extruding a plurality of molten strands, forming a base layer from the molten strands and pressing the plurality of molten strands onto the first surface of the absorptive layer such that regions of the first surface of the absorptive layer are exposed, thereby allowing sound to pass between adjacent discrete segments.

Still other embodiments, combinations, advantages and objects of the present invention will become apparent to those skilled in the art from the following descriptions wherein there are shown and described alternative exemplary embodiments of this invention for illustration purposes. As will be realized, the invention is capable of other different aspects, objects and embodiments all without departing from the scope of the invention. Accordingly, the drawings, objects, and description should be regarded as illustrative and exemplary in nature only and not as restrictive.

DETAILED DESCRIPTION OF THE INVENTION

Figure 1:
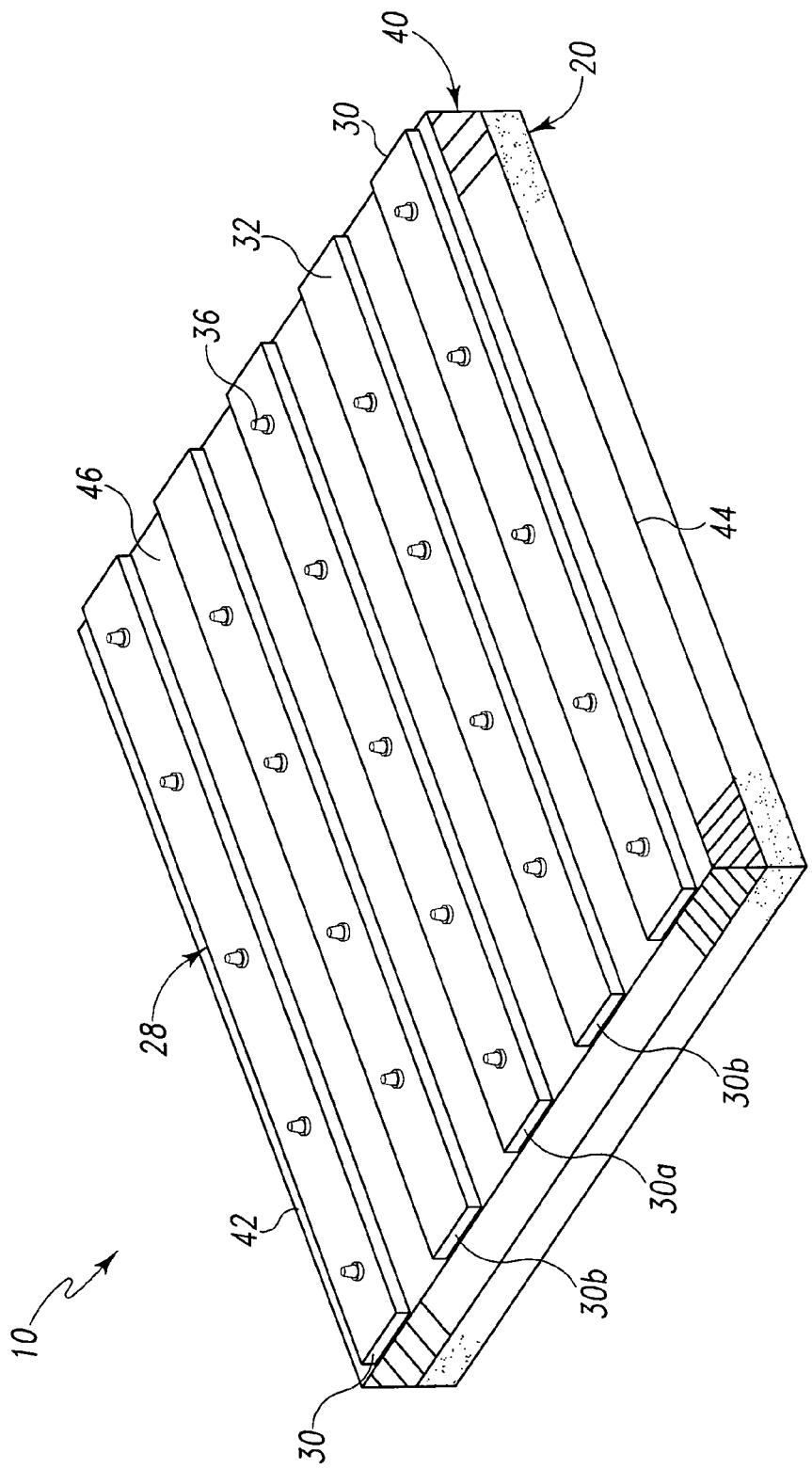
FIG. 1 is a perspective view of an exemplary embodiment of the acoustic mat of the present invention.
Figure 2:
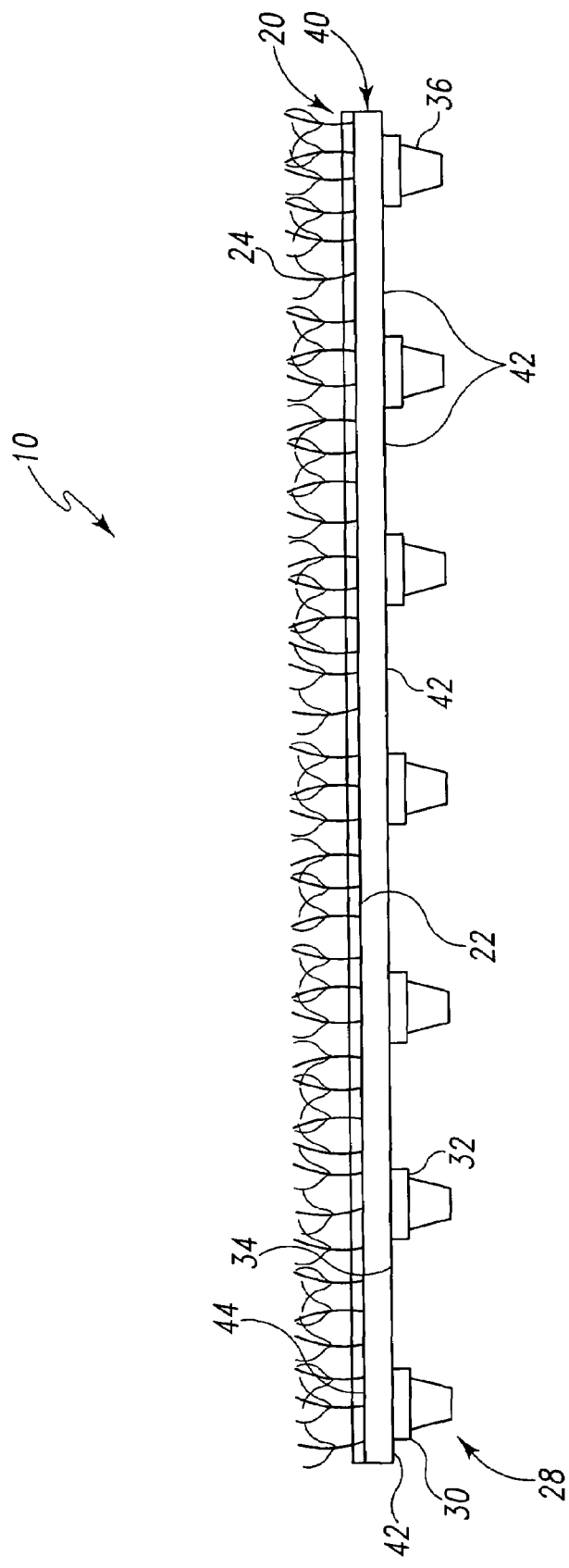
FIG. 2 is a cross sectional view of the acoustic mat shown in FIG. 1.

The present invention provides multi-layer acoustic mats and methods for making the same. Referring to FIGS. 1 and 2, an exemplary embodiment of an acoustic mat 10 of the present invention is shown as including a face layer 20, an absorptive layer 40 and a base layer 28. As illustrated, the base layer 28 may comprise a plurality of segments 30 (also, 30a-30b). It should be understood that the absorptive mat 10 in FIG. 1 is depicted upside down in that, during use, face layer 20 will typically be exposed to the interior of the automobile (e.g. the occupant) while the base layer 28 (comprising segments 30) will rest upon the surface to be covered by mat 10 (e.g. carpeted floor of the cabin).

As illustrated in FIGS. 1 and 2, the face layer 20 may include a first face 22 and a second face 24 (FIG. 2). In one embodiment, the face layer 20 may be substantially porous to allow sound waves and/or air to travel through the face layer 20 and into and/or through the absorptive layer 40. For example, face layer 20 may be made using any porous fabric materials such as tufted carpet, needle punch fabric, woven fabric, flocked fabric, or perforated films. In addition, the fabrics may be made from any natural or synthetic type porous materials such as PA, polypropylene (PP), (PET), PE, PVC, wool, cotton, blends, or any combination thereof. If a carpet is used, it may comprise any type of pile or yarns suitable for use as the exposed surface of the mat. In addition, the face layer may also include a spun bonded, porous carpet scrim, such as for example, PET, PET/PA, PP, etc. In the exemplary embodiment illustrated, the face layer 20 may be a carpet material, which is wear-resistant and has a pleasing appearance.

Still referring to FIGS. 1 and 2, the absorptive layer 40 may be formed from a material that, similar to the face layer 20, is air and/or sound permeable and sufficiently porous to allow sound waves to pass through. In another embodiment, the absorptive layer 40 may be formed of a sound absorbing material that exhibits good acoustic absorption characteristics (i.e., effectively absorbs acoustic or sound energy). In such case, absorptive layer 40 may exhibit superior acoustic absorption as compared to the material of the base layer. Of course, it should be understood that absorptive layer 40 may both absorb and transmit (i.e., in different portions) sound waves. In such embodiment, the absorptive layer 40 may be comprised of multiple layers, wherein each layer may have distinguished properties and dimensions and be adhered, bonded, punched, stitched or otherwise secured to one another to form the absorptive layer.

As illustrated in FIGS. 1 and 2, absorptive layer 40 may be formed from needle punch felt such as PP, PET, PE, PA, or combinations thereof. In another exemplary embodiment, the absorptive layer 40 may be formed from open cell foam materials such as polyurethane polyesters and polyether, PP, PVC, or SBR. Other suitable fibrous materials that may be used to form the layer 40 are glass micro fibers or fiberglass. Different types and sizes of fibers may be used depending upon the air permeability and sound absorption desired or required. It is believed that by combining different materials and blend into the absorptive layer, sound traveling through the cabin and sound traveling through the floor board of an automobile into the cabin can be simultaneously reduced. In the exemplary embodiment of FIGS. 1 and 2, absorptive layer 40 may be made from 10 oz. non-woven polyester needle punch. The normal incidence sound absorption coefficient of this exemplary material can be, for example, at least about 0.1 at 500 Hz, at least about 0.2 at 1000 Hz or at least about 0.5 at 2000 Hz, as determined in accordance with The American Society of Tests and Materials (ASTM) standard test procedure E 1050. The acoustic absorbing layer 40 of this exemplary embodiment may be air permeable with an airflow resistance value of at least 3.0 $m^3/cm^2/sec$ as measured in accordance with HES D6506-00, Section 5.17 standard.

The second surface 44 of the absorptive layer 40 may be attached (i.e., adhesively bonded) to the first face 22 of the face layer 20 using a variety of methods, including but not limited to latex, hot melt, or flame bonds. It is contemplated that the bond may be sufficiently porous to allow sound to permeate and travel through the bonding layer to prevent disruption of sound flow achieved through desired selection of the materials in the face and absorptive layers. For example, a latex may utilized comprising a porous SBR-based or EVA-based latex. Hot melt adhesives utilized may comprise powder coat (e.g., LDPE), spray adhesive, strand die, web, or slit film, including but not limited to EVA, LDPE, PU, PP, copolymers, blocked copolymers.

If desired, a second coating (i.e., a second latex or adhesive) may be applied to the first face 22 to attach the first face 22 of the face layer 20 to the second surface 44 of the absorptive layer 40. In addition, rather than manufacturing and securing the face layer 20 and absorptive layer 40 on-site, the face layer 20 and the absorptive layer 40 may be a pre-assembled product. In such embodiment, the face layer 20 and the absorptive layer 40 form a web and may be porous such that sound waves may travel through the face layer 20 and either be absorbed by and/or pass through the acoustic absorptive layer 40. For example, as illustrated, the face layer 20 may comprise a tufted carpet through a non-woven porous scrim. In this exemplary embodiment, the first face 22 of the face layer 20 may comprise a water-resistant and air/sound permeable tuft bind material (e.g. a primary latex). The first surface 22 of the face layer 20 can allow the sound traveling through the face layer 20 to be absorbed by and/or to pass through the absorptive layer 40 but prevent liquids from flowing through the mat 10 to a surface covered by the mat (e.g., automobile interior carpet). As used herein, however, web may refer to a pre-assembled face and/or absorptive layer used in the process of manufacturing or the product of a face and absorptive layer manufactured on-site.

Still referring to FIGS. 1 and 2, it may also be desired to manufacture an absorptive layer 40 having a high coefficient of friction for instances where interface between the absorptive layer and the surface to be covered is desired. For example, exposed regions 46 (discussed later) of the acoustic layer 40 may be configured to protrude or extend beyond the base layer 28 (discussed later) such that the regions 46 come in contact with a surface that the mat is covering (e.g., automobile floor). When the regions 46 come in contact with the surface (not shown), they can act as a friction surface holding the mat in its desired position to supplement or replace the protrusions 36 on segments 30 (discussed later). In another embodiment, the protruding regions may include a coating (i.e., an adhesive) that may enhance the resulting friction surface to grip and hold the mat in the desired position. Also, as discussed later herein, segments may similarly comprise a friction surface configured to secure the mat 10 in a desired location.

As illustrated in FIGS. 1 and 2, base layer 28 may comprise a plurality of segments 30 including first and second sides 32 and 34, respectively. The segments 30 may be made from a variety of polymeric materials. In one exemplary embodiment, the segments 30 can be made from extruded thermoplastic, including but not limited to TPE, TPR, TPO, PVC, TPV and 60 d shore A. In another embodiment, the segments 30 may be made from compression molded thermoset plastic such as SBR or urethane. In yet another exemplary embodiment, the segments may be made from a TPE such as INTERION 3000-70a-BK, manufactured/distributed by VI-CHEM Corporation.

Second sides 34 of segments 30 may be secured to the first face 42 of absorptive layer 40. The segments 30 may be secured or extruded onto the first face 42 of absorptive layer 40 in a variety of methods (i.e., melt bonding, adhesive bonding). For example, where melt bonding is desired, the segments may be extruded and then pressed against the first surface 42 of absorptive layer 40. This allows portions of the molten segment material to enter into and intertwine with the fibers of the absorptive layer 40, producing a molten bond once cooled between segments 30 and the absorptive layer 40. Of course, it should be understood that segments 30 may be secured directly to face layer in another embodiment.

As illustrated in FIGS. 1 and 2, discrete segments 30 may be secured to absorptive layer in a spaced-apart arrangement such that portions or regions 46 of the first face 42 of the acoustic layer 40 are exposed, i.e., not covered by the base layer (segments 30). These exposed regions 46 allow sound waves (and/or air) to either pass between adjacent discrete segments 30 and into the absorptive layer 40, or where desired and manufactured, to pass through the face and absorptive layers and between the adjacent segments 30 into the surface covered by the mat.

As discussed, it is contemplated that segments 30 of base layer 28 may be discrete from one another. As used herein, the term "discrete" means that each segment 30 is separate and distinct from the other segments 30 bonded or secured to the acoustic layer 40. For example, the segments 30 may not be one single body or continuous layer but a plurality of unconnected bodies or segments 30 secured to the absorptive layer 40. As described above, the plurality of discrete segments 30 may be secured to the absorptive layer 40 in a spaced-apart fashion such that regions 46 of the first surface 42 of the acoustic absorbing layer 40 are exposed, i.e., not completely covered by the segments 30. In an exemplary embodiment, the exposed regions 46 may comprise at least 30% of the entire first surface 42 of the absorptive layer 40. In an alternative embodiment, the exposed regions 46 may comprise at least 50% of the entire first surface 42 of the absorptive layer 40. In still another alternative embodiment, the exposed regions 46 may comprise at least 60% of the entire first surface 42 of the absorptive layer 40. Of course, other percentages of exposed regions are possible.

As shown in FIG. 1, the segments 30 are substantially rectangular in shape (e.g., as elongate strips). However, segments may comprise any number of shapes, including alternative widths and lengths. Of course, it should be understood that segments 30 may be arranged on absorptive layer in any number of arrangements. Such embodiments include, but are not limited to forming segments diagonally, circularly, in a U-shaped or any other letter-shaped arrangement with respect to the absorptive layer. In addition, four segments 30 may be disposed along and parallel with the peripheral edge of the mat, forming a border. The border may incompletely define the exposed regions 46 in one embodiment. The mat 10 may then include a plurality of segments 30 disposed inside these four peripheral segments 30 in a parallel, spaced apart pattern. In yet another embodiment (discussed later herein), base layer 28 may comprise one or more segments extruded onto absorptive layer which have been melted and/or fused together to form a complete base layer 28 with or without areas of absorptive layer being exposed. More specifically, the segments may be selectively melted and/or fused so as to create a mesh of exposure areas of the absorptive layer. Accordingly, it should be understood that the invention encompasses not only arrangements of discrete segments on an absorptive or face layer, but also manipulation of discrete segments to form a specifically desired pattern of segments or protrusions.

With respect to protrusions, still referring to FIGS. 1 and 2, segments 30 may comprise a plurality of protrusions 36 having a conical shape to prevent slippage of the mat 10 about a covered surface. More particularly, the protrusions 36 may be configured to confront a surface covered by the mat 10, such as interior floor board or carpet of an automobile, and grip the surface to prevent the mat from moving out of a desired position. In the exemplary embodiment shown in FIG. 1, the protrusions 36 of the adjacent segments 30 may be staggered, wherein the protrusions 36 of a segment 30a are not aligned with the protrusions 36 of either segment 30b adjacent to it. However, it should be understood that protrusions 36 may take any pattern without departing from the scope of the present invention. For example, protrusions 36 of all the adjacent segments 30 may be aligned in the latitudinal direction and comprise any size or shape, including but not limited to cylindrical-shaped, triangular-shaped, etc., without departing from the scope of the invention. It is contemplated that the plurality of protrusions may comprise an additional friction surface to either replace, or work in conjunction with the friction surface of the absorptive layer, where present.

Figure 3:
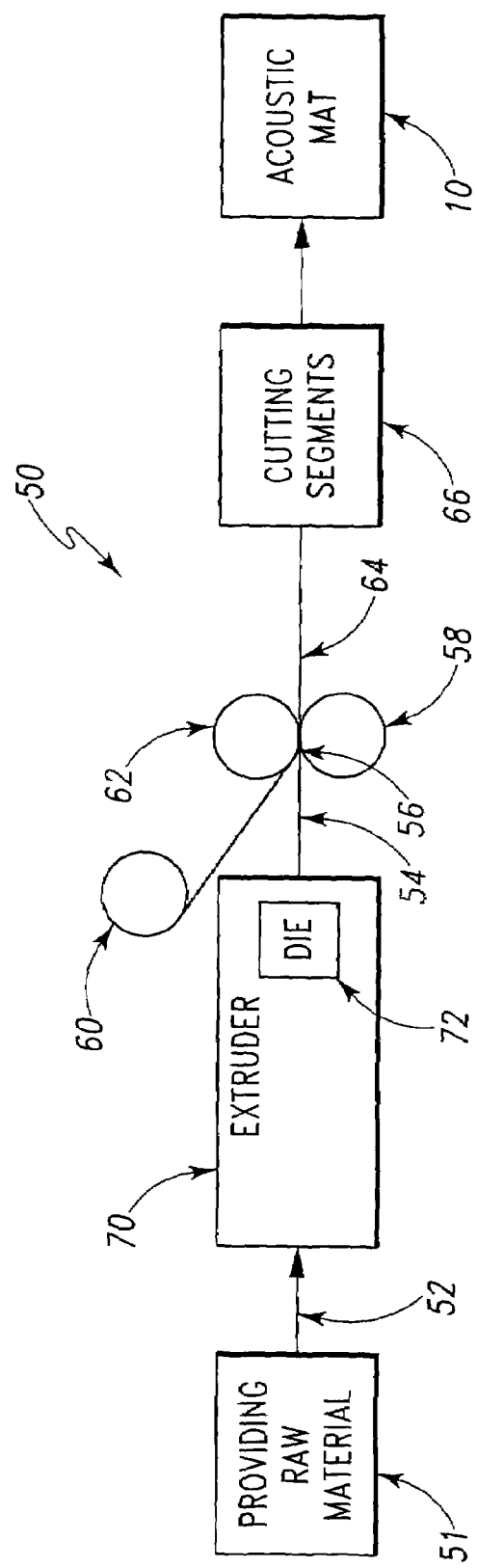
FIG. 3 is a block schematic of exemplary machinery utilized to practice an exemplary method of forming the acoustic mat shown in FIG. 1.
Figure 4:
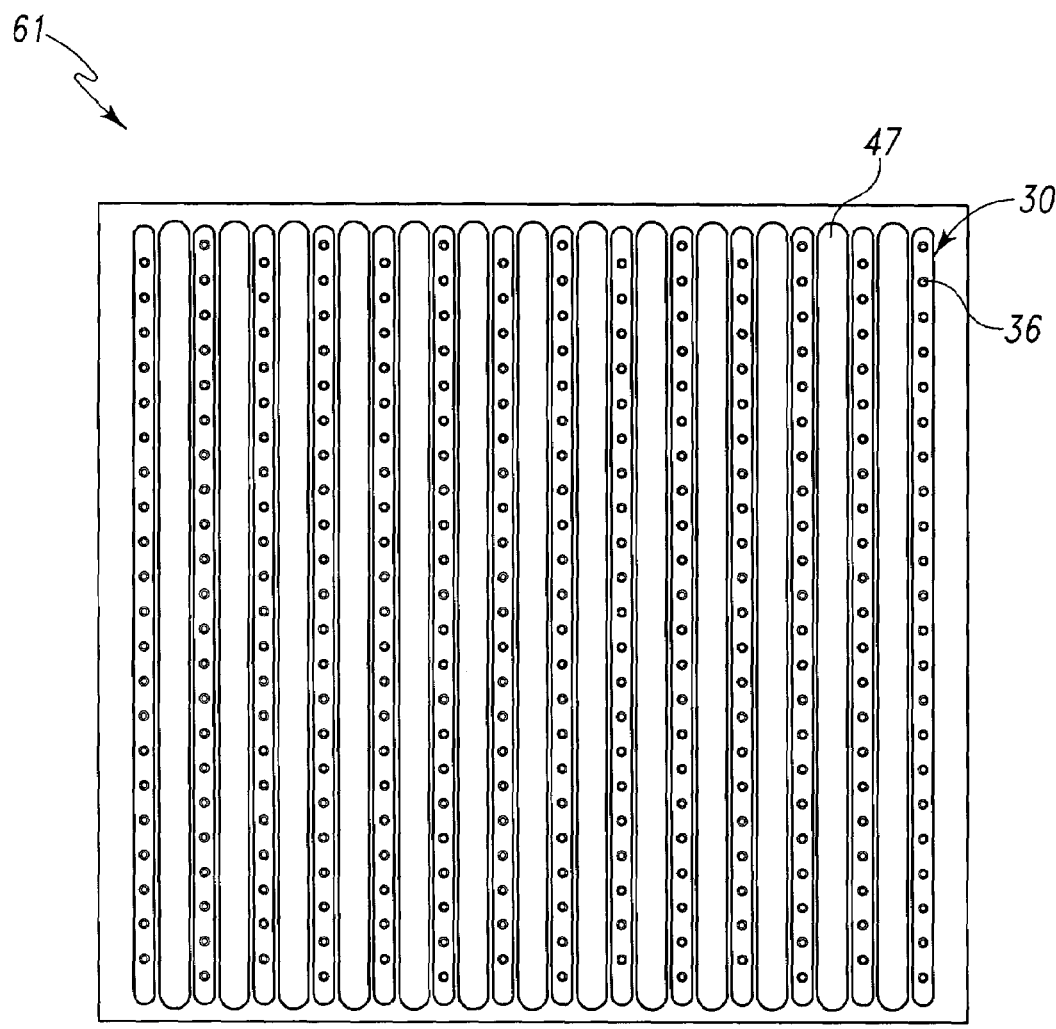
FIG. 4 is a plan view of an exemplary embodiment of a base layer imprint design for a calendar roll for forming an exemplary embodiment of the acoustic mat shown in FIG. 1.
Figure 5:
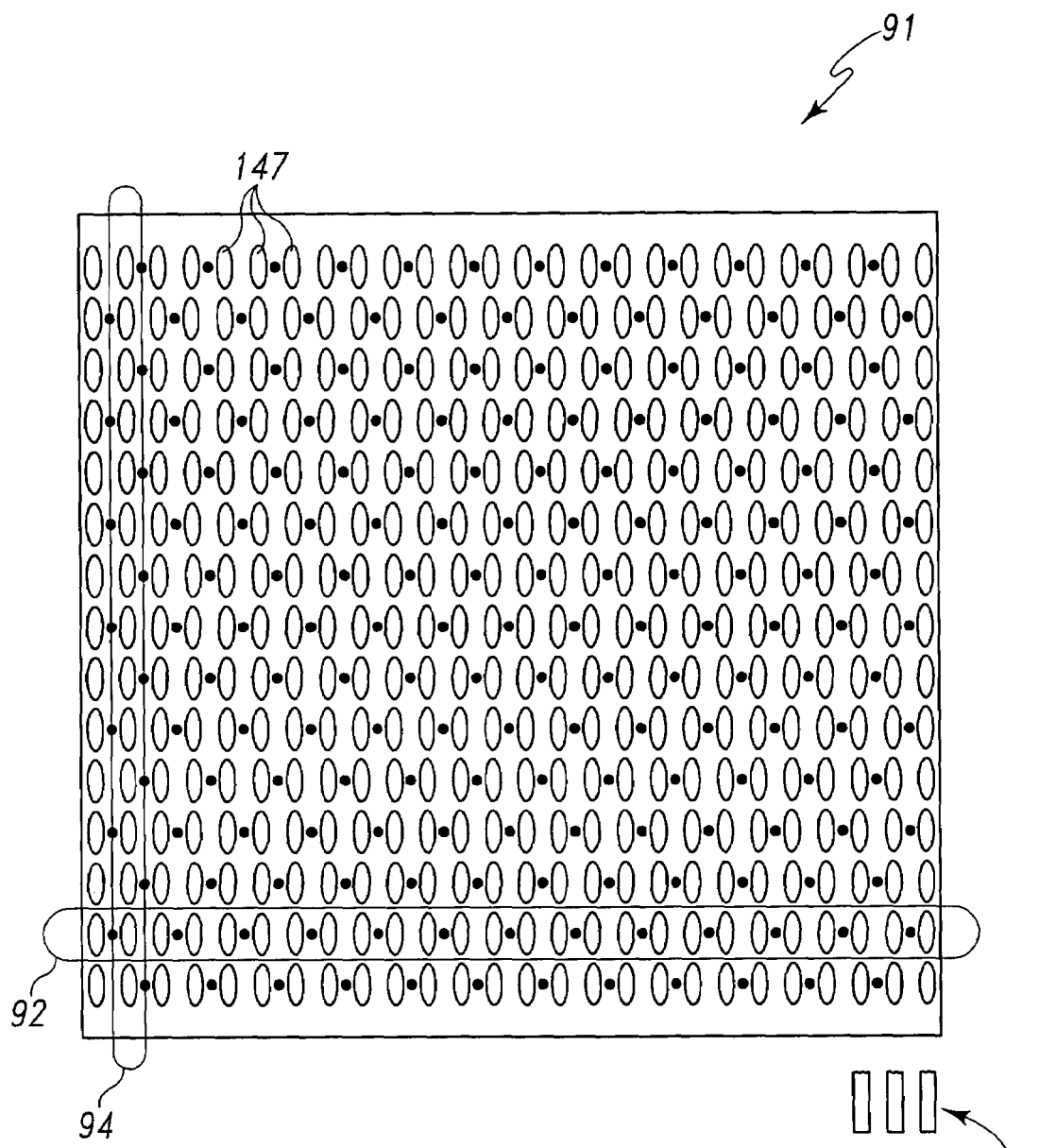
FIG. 5 is a plan view of an exemplary embodiment of a base layer imprint design for a calendar roll for forming an alternative embodiment of the acoustic mat.

Referring now to FIGS. 3-5, exemplary apparatus utilized with exemplary methods for making an absorptive mat of the present invention are schematically illustrated. Referring to FIG. 3, a base layer may be formed by first feeding (52) a raw polymeric material (e.g., TPE) 51 into an extruder 70, which heats and mixes the TPE. The extruder 70 then pushes the resulting molten material (e.g., having a paste consistency) through one or more dies 72 located at an exit end of the extruder 70.

The molten material is extruded out of extruder 70 as a plurality of strands of molten plastic, shown collectively as 54. The molten strands 54 enter a nip 56 formed between a calendar roll 58 and a nip roll 62. The calendar roll 58 includes a plurality of molds or channels (e.g., such as design 61 in FIG. 4) having the shape of the segments 30, which, if desired, include molds for the protrusions 36. More particularly, when the plurality of strips of molten plastic 54 enter the nip 56, the nip 56 forces the molten plastic into the plurality of molds (e.g., such as design 61 in FIG. 4), forming a plurality of segments or a base layer having a plurality of protrusions 36 extending therefrom.

At the same time the plurality of strips of molten plastic 54 are entering the nip 56, the web 60 (i.e., face layer 20 and attached absorptive layer 40) also enters this nip 56. As the nip 56 presses the molten plastic into the segment molds, downstream it also presses or extrudes the molten plastic onto the first face 42 of the absorptive layer 40. Although in this exemplary process the molten strips are not directly extruded onto the absorptive layer because they first travel through nip 56, it should be understood that "extruded onto" or "on" the acoustic layer can mean plastic is directly or indirectly (e.g. downstream) extruded onto the acoustic layer. Once the molten plastic begins to cool, it forms a melt bond between the segments 30 and the absorptive layer 40. Of course, segments may be formed and adhesively bonded to the absorptive layer in another embodiment. As the resulting mat assembly 64 (i.e., web 60 with attached molded strips 54) exits the nip 56, the strips 54, which have begun to cool and harden, pull from the molds of the calendar roll 58. The mat assembly 64 may continue down the production line to be cut or die trimmed into the desired shape. Alternatively, the mat assembly may be rolled for storage of shipping. Once cut into the desired shape, a serge edge (not shown) may be sewn along the peripheral edge of the shaped mat 10 to give the edges of the mat 10 a finished appearance. In one embodiment, the sewn material may be sewn through the face layer, absorptive layer, and/or the segments 30. If a positive retention system is desired, the mat may continue further down the line to have the grommets applied to the mat. In addition, any emblems, logos, or other markings may be added to the mat before final packaging.

As previously discussed, FIG. 4 shows a representative flat plate design 61 that can be cut into a calendar roll mold for manufacturing the acoustic mat illustrated in FIG. 1. As illustrated, plate 61 (and ultimately, roll mold) may be configured so that segments 30 will be manufactured in a spaced-apart arrangement with regions 47 that will form the arrangement and exposure areas of the acoustic layer 40. Accordingly, it is contemplated that the arrangements of segments and the resulting exposure areas of the acoustic layer can be manipulated through manufacturing of a specifically designed calendar roll. Referring to FIG. 5, another exemplary embodiment of a representative flat plate design 91 that can be cut into a calendar roll mold is illustrated. In this embodiment, a mat formed with a calendar roll incorporating such plate 91 may comprise a single sheet base layer having a plurality of protrusions extending outwardly therefrom and a plurality of regions 147 exposing an acoustically absorptive layer. The alternative mat may be similar as described in the above embodiments except that the resulting base layer formed from the molten strands would be a single sheet of polymeric material because of the fusion between the molten strands in the calendar roll. More specifically, the calendar roll in this embodiment includes a plurality of interconnected channels running both latitudinally and longitudinally (e.g., represented on plate 91 as 94 and 92, respectively). A calendar roll incorporating such channels can form a single sheet layer of polymeric material, forming the base layer. When the molten polymeric material is pressed by the nip 56 (e.g. FIG. 3) into the latitudinal segment mold channels 54 it may also flow between the adjacent longitudinal segment mold channels via the interconnecting longitudinal mold channels. However, there are also regions 147 on the roll that do not allow plastic flow and thus form openings within the single sheet base layer. These openings in the base layer expose regions of the absorptive layer (i.e., do not cover the absorptive layer), allowing sound waves to pass through the base layer and either out of or into the absorptive layer. As described above, as the strands of molten plastic are fed into the nip 56, a pre-assembled web 60 may also be fed into the nip 56 and extruded onto the acoustically absorptive layer.

Accordingly, the exemplary acoustic mats described herein can be manufactured in a continuous process (e.g. continually forming a mat assembly from raw materials and webs) resulting from the extrusion of specifically designed base layers, or more specifically segments, onto absorptive or web layers. As such, acoustic mats can be manufactured at a rate greater than one at a time. This cuts time, manpower and machinery necessary for manufacturing mats. In addition, as the mat assembly is continuously formed, it can be assembled into a roll downstream for storage or transport. It is also contemplated that more than one shape of mat may be cut from a section of the roll of mat. For example, two front mats having different shapes for driver and passenger and two rear mats for back seat occupants can be cut from one machine, based on one section of mat made from the exemplary processes described herein. Accordingly, benefits of the invention include mats with specifically designed base layers and a cost effective process for making the same.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. For example, the acoustic mat and methods of making the same in accordance with the present invention may include discrete segments arranged in a number of configurations and may be manipulated so as to create any desired configurations. Accordingly, while some of the alternative embodiments of the acoustic mats and methods have been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What is claimed is:

1. A method for making an acoustic mat comprising:
   providing a web comprising a face layer and an absorptive layer having first and second surfaces;
   extruding a plurality of discrete molten strands;
   forming a base layer comprising a plurality of discrete segments from said plurality of discrete molten strands;
   assembling a mat assembly by pressing said base layer on said first surface of said absorptive layer such that a plurality of parallel regions of said absorptive layer are exposed between outermost of said discrete segments, thereby allowing sound to pass between adjacent segments; and
   cutting a mat from said mat assembly into a predetermined shape.

2. The method of claim 1, wherein said forming a base layer further comprises passing said molten strands through a nip formed by a calendar roll and a nip roll, wherein said nip forces said strips into a plurality of mold channels configured to form said plurality of discrete segments.

3. The method of claim 2, further comprising passing said web through said nip.

4. The method of claim 3, wherein said discrete segments are extruded onto said absorptive layer after said web enters said nip.

5. The method of claim 1, further comprising providing a surge edge along a peripheral edge of said mat.

6. The method of claim 1, wherein said cutting further comprises cutting a plurality of mats from said mat assembly into predetermined shapes.

7. The method of claim 1, wherein said forming a base layer comprises fusing said plurality of molten strands.

8. A method for making an acoustic mat comprising:
   providing a web having first and second surfaces;
   extruding a plurality of discrete molten strands;
   forming a base layer by passing said molten strands through a nip formed by a calendar roll and a nip roll, wherein said nip forces said strips into a plurality of mold channels configured to form a plurality of discrete segments;
   assembling a mat assembly by extruding said base layer on said first surface of said web such that a plurality of parallel regions of said web are exposed between outermost of said discrete segments, thereby allowing sound to pass between adjacent segments; and
   cutting a mat from said mat assembly into a predetermined shape.

9. The method of claim 8, wherein said web comprises a face layer and an absorptive layer.

10. The method of claim 8, wherein said discrete segments are extruded onto said web after said web enters said nip.

* * * * *